(12) United States Patent  
Frank et al.

(10) Patent No.: US 7,496,510 B2  
(45) Date of Patent: Feb. 24, 2009

(54) METHOD AND APPARATUS FOR THE AUTOMATIC SEPARATING AND INDEXING OF MULTI-SPEAKER CONVERSATIONS

(75) Inventors: Joachim Frank, Greenwich, CT (US); Werner Kriechbaum, Ammerbuch-Breitenholz (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 09/997,957

(22) Filed: Nov. 30, 2001

(65) Prior Publication Data

US 2002/0091517 A1     Jul. 11, 2002

(51) Int. Cl.
   *G10L 17/00*     (2006.01)
(52) U.S. Cl. .................. 704/246; 704/250; 704/249
(58) Field of Classification Search ............. 704/246, 704/260, 273, 238, 214, 208, 233, 270.1, 704/231, 270, 247, 249, 252, 235, 239, 245
   See application file for complete search history.

(56) References Cited

U.S. PATENT DOCUMENTS 5,598,507 A * 1/1997 Kimber et al. ............. 704/246
6,076,059 A * 6/2000 Glickman et al. .......... 704/260
6,141,644 A * 10/2000 Kuhn et al. ................ 704/273
6,332,122 B1 * 12/2001 Ortega et al. .............. 704/270
6,532,446 B1 * 3/2003 King ....................... 704/270.1

OTHER PUBLICATIONS

Bonastre, J.-F.; Delacourt, P.; Fredouille, C.; Merlin, T.; Wellekens, C.; "A speaker tracking system based on speaker turn detection for NIST evaluation"Acoustics, Speech, and Signal Processing, 2000. ICASSP '00. Proceedings. 2000 IEEE International Confe.*

* cited by examiner

*Primary Examiner*—Huyen X. Vo  
(74) *Attorney, Agent, or Firm*—Ference & Associates LLC

(57) ABSTRACT

Disclosed are a method and apparatus for processing a continuous audio stream containing human speech in order to locate a particular speech-based transaction in the audio stream, applying both known speaker recognition and speech recognition techniques. Only the utterances of a particular predetermined speaker are transcribed thus providing an index and a summary of the underlying dialogue(s). In a first scenario, an incoming audio stream, e.g. a speech call from outside, is scanned in order to detect audio segments of the predetermined speaker. These audio segments are then indexed and only the indexed segments are transcribed into spoken or written language. In a second scenario, two or more speakers located in one room are using a multi-user speech recognition system (SRS). For each user there exists a different speaker model and optionally a different dictionary or vocabulary of words already known or trained by the speech or voice recognition system.

30 Claims, 4 Drawing Sheets

```
            <transcript file="audio/20000510.log">
            ...
400 ──────  <begincall time="08:00:04:30"/>

420 ──────  <speaker id="s0127" starttime="08:00:04.30"
            endtime="08:00:14:40">

410 ──────  <text>Satisfaction Guaranteed Phone Order
            Department</text>

</speaker>

430 ──────  <speaker id="unknown" starttime="08:00:17.40"
            endtime="08:00:30.30"/>

450 ──────  <speaker id="s0127" starttime="08:00:30.30"
            endtime="08:00:34:00">

440 ──────  <text>To process your order I need your customer
            number please</text>

<speaker id="unknown" starttime="08:00:40.30"
            endtime="08:03:30.30"/>

<speaker id="s0127" starttime="08:03:30.30"
            endtime="08:03:34:00">

460 ──────  <text>137532 and the address is Helga Mustermann,
            Birkenweg 7, 12345 Dorf right</text>

<speaker id="unknown" starttime="08:03:04.30"
            enditme="08:06:06.00"/>
            ...
470 ──────  <endcall time="08:10:25.01"/>

</transcript>
```

FIG. 4

METHOD AND APPARATUS FOR THE AUTOMATIC SEPARATING AND INDEXING OF MULTI-SPEAKER CONVERSATIONS

BACKGROUND OF THE INVENTION

The invention generally relates to the field of digital audio processing and more specifically to a method and apparatus for processing a continuous audio stream containing human speech related to at least one particular transaction. The invention further relates to a multi-user speech recognition or voice control system.

Business transactions are increasingly conducted by way of telephone conversation. Exemplarily it is referred to audio logs of call center dialogues which have to be accessed in order to locate specific transactions. Another example are logs which are stored on audio tapes and can be accessed by scanning corresponding tape archives.

Beyond that it is to be expected that in the future many transactions like teleshopping or telebanking will be handled by automatic transaction systems using text to speech synthesis to communicate with a customer. Another substantial and still growing amount of transactions is the field of telephone conversation which takes place between two human individuals, in particular two individuals speaking different languages.

A particular field of transactions is transactions that are legally binding. It is current practice to record the underlying interactions on audio tapes to have a log of each interaction. For legal reasons, in cases where both parties disagree about an intended transaction at a later date, these logs can be used as a proof instrument. Nowadays such tapes are labeled with a date information and a customer or employee identifier. This makes the task of locating and indexing an audio log of a specific transaction an extraordinary effort.

Prior efforts to automize the indexing of such audio material, e.g. using prior art speech recognition technology, failed due to the large variability of speech styles and dialects of the human individuals engaged in those interactions.

Another application field is multi-user speech recognition systems (SRSs) where two or more speakers are located in the same room, e.g. a typical mixed conversations during personal meetings or the like which shall be protocolled using SRS technology. Another similar situation is command language used in an aircraft cockpit where the pilot and the co-pilot operate the aircraft via voice control. As modem SRSs have to be trained for different users, these systems so far are not able to automatically switch between the different speakers.

SUMMARY OF THE INVENTION

It is therefore an object of the present invention to provide a method and apparatus which allow to simplify the aforementioned processing of a continuous audio stream containing human speech.

It is another object to provide such a method and apparatus which allow for an automized processing of an audio stream incoming in real-time or being stored on a storage media.

It is yet another object to provide such a method and apparatus which reduce the costs and time efforts for locating specific transactions or speaker-related audio segments in a continuous audio stream.

The above objects are solved by the features of the independent claims. Advantageous embodiments are subject matter of the subclaims.

The idea underlying the invention is to locate segments in a continuous audio stream where a change-over to at least one predefined speaker occurs and to apply speech recognition or voice control techniques only to those audio segments belonging to the predefined speakers.

In view of the common practice in commercial or business transaction-related conversations or dialogues, in order to avoid miscommunication, the essential information to identify a customer, employee or the like is obtained as customer name or account number uttered and repeated at the beginning of a dialogue and thus the proposed mechanism is able to capture all the essential information necessary to identify and transcribe the audio information related to the particular underlying transaction.

More particularly, the invention proposes to apply known speaker recognition techniques to conversations between a well-known speaker and a multitude of unknown speakers and thereby allows to transcribe only the utterances of the well-known speaker as index and summary of the dialogues.

It is noteworthy that the two steps of detecting at least one speaker change in the continuous audio stream and of performing a speaker recognition for the audio stream at least after an allegedly detected speaker change can be performed in an arbitrary order. Performing a speaker change detection prior to performing a speaker recognition has the advantage that the processing resources and time consuming mechanism of speaker recognition must only be executed if a speaker change is detected wherein the speaker change detection process is much less consuming resources than the speaker recognition. On the other hand, executing both steps in the reverse order has the advantage that the speaker change can be detected using the results of the speaker recognition and must not be implemented as an independent step thus simplifying the entire mechanism.

According to a first alternative of the invention, a real-time incoming continuous audio stream, e.g. speech that is going to be transcribed by a speech recognizer or an incoming telephone call, is scanned in order to detect a speaker change. Further it is analyzed if the detected audio segment(s) is belonging to a predetermined or preselected speaker wherein only those audio segments belonging to the predetermined speaker(s) are transcribed e.g. into plain text by way of speech recognition.

As a second alternative, a continuous audio stream, e.g. a telephone call or the like, is first recorded on a record media like a magnetic tape, CD-ROM or a computer hard disk drive (HDD) and the recorded audio stream is scanned in order to detect audio segments belonging to a predefined speaker. These audio segments are then indexed and only the indexed segments are transcribed into spoken or written language later on. Thus a particular human speech-based transaction can be found in a large, unstructured storage media like a magnetic tape.

In a third alternative, the invention is used to enable speaker-triggered speech or voice recognition in a multi-user speech recognition or voice control environment providing, for each user, a different speaker model and optionally a different dictionary or vocabulary of words already known or trained by the speech or voice recognition system. In such an environment it is necessary to switch between different dictionaries when a first user has stopped utterance and a second user is going to start his utterance. Hereby a real-time continuous audio stream has to be processed in order to distinguish between utterances of the different users.

It should be noted that use of the invention is by no means limited to the above mentioned application fields and thus can be used or implemented, for instance, in a voice activation control system of an automobile or aircraft or the like. It can also be used to separate background speech signals in order to filter those signals from a currently interesting speech signal or utterance, e.g. in a scenario where two or more people are staying in the neighborhood or at least within an audible distance, each of them using a speech recognition or dictating system or a voice control system.

BRIEF DESCRIPTION OF THE DRAWINGS

In the following the invention will be described in more detail referring to the accompanying drawings from which further features and advantages will become evident. In the drawings

FIG. 4 shows an example of a log file encoded using XML markup language in accordance with the invention.

DETAILED DESCRIPTION OF THE DRAWINGS

Figure 1A:
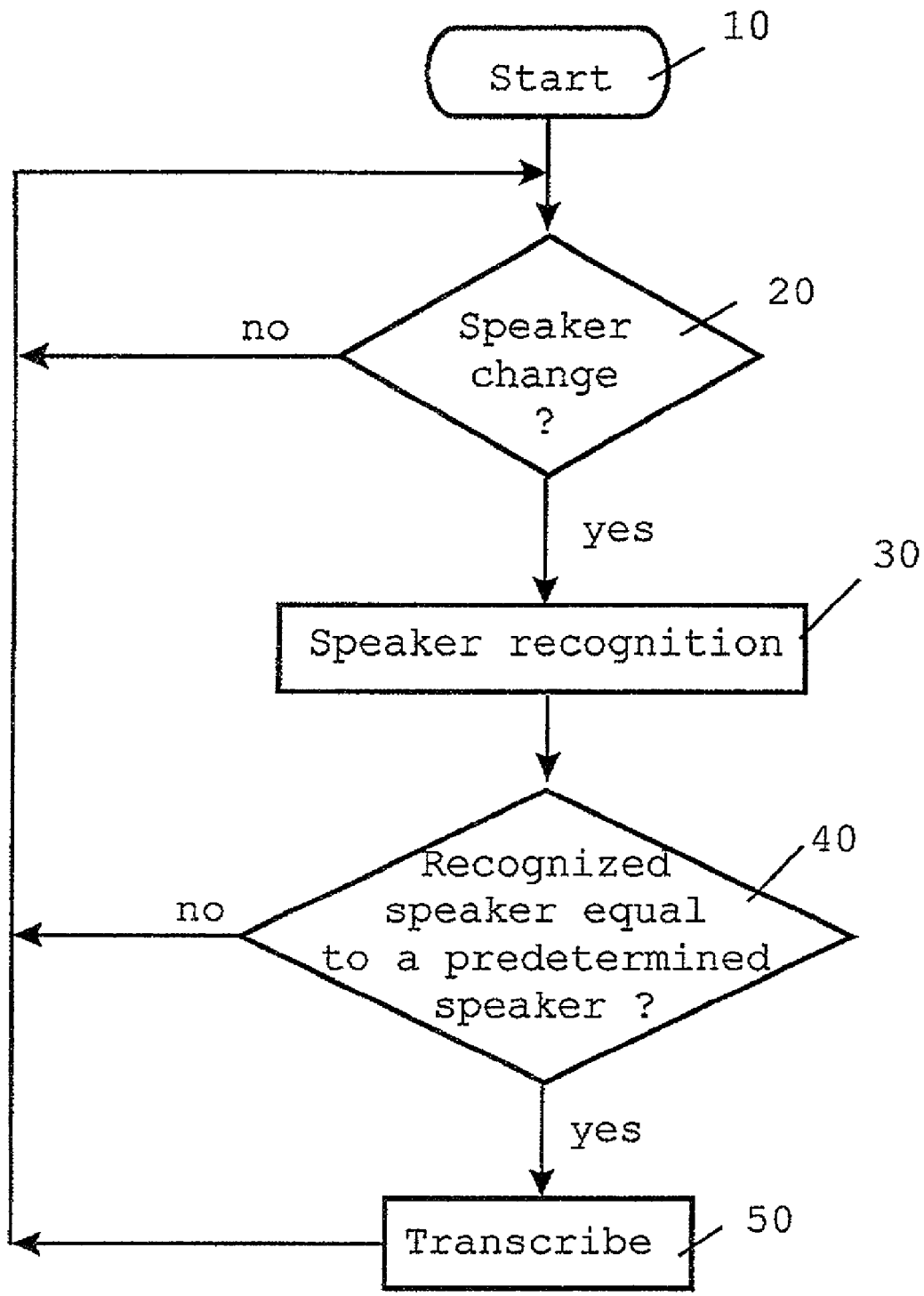
FIG. 1a is a flow diagram which illustrates the basic features and steps of the method according to the invention.

FIG. 1 a shows the basic steps of a routine processing a continuous audio stream in accordance with the invention. After the routine is started 10 and the audio stream is digitized (not shown here) the digitized audio stream is analyzed in order to locate speaker changes 20. A lot of speaker change and speaker detection algorithms are known in the literature. For a comparison of techniques see for example F. Bimbot et al., Second-Order Statistical Measures for Text-Independent Speaker Identification, Speech Communication, Vol. 17, p.177-192, 1995. Hereby, for instance, the audio stream can be analyzed at frequency bands in order to derive characteristic features for different speakers. For a speaker change detection such feature vectors may be subjected to classical change detection techniques as described in the textbook by M. Basseville and Igor V. Nikiforov, Detection of Abrupt Changes: Theory and Applications, Prentice Hall Englewood Cliffs 1993, whereas for speaker identification the features are matched against a database of known speakers (S. Furui, An Overview of Speaker Recognition Technology, Proc. ESCA Workshop on Automatic Speaker Recognition, Identification and Verification, p.1-9, Martigny 1994).

If a speaker change is detected, for at least part of the following audio stream a speaker recognition is performed 30. Otherwise the speaker change detection is repeated until a speaker change is detected at all. After the speaker recognition 30 is finished it is checked 40 whether the recognized speaker is equal to a predetermined or preselected speaker or alternatively whether the speaker is recognized as a known speaker at all. If so at least the above mentioned part of the audio stream is transcribed, e.g. into plain text by means of a known speech recognition technique.

Figure 1B:
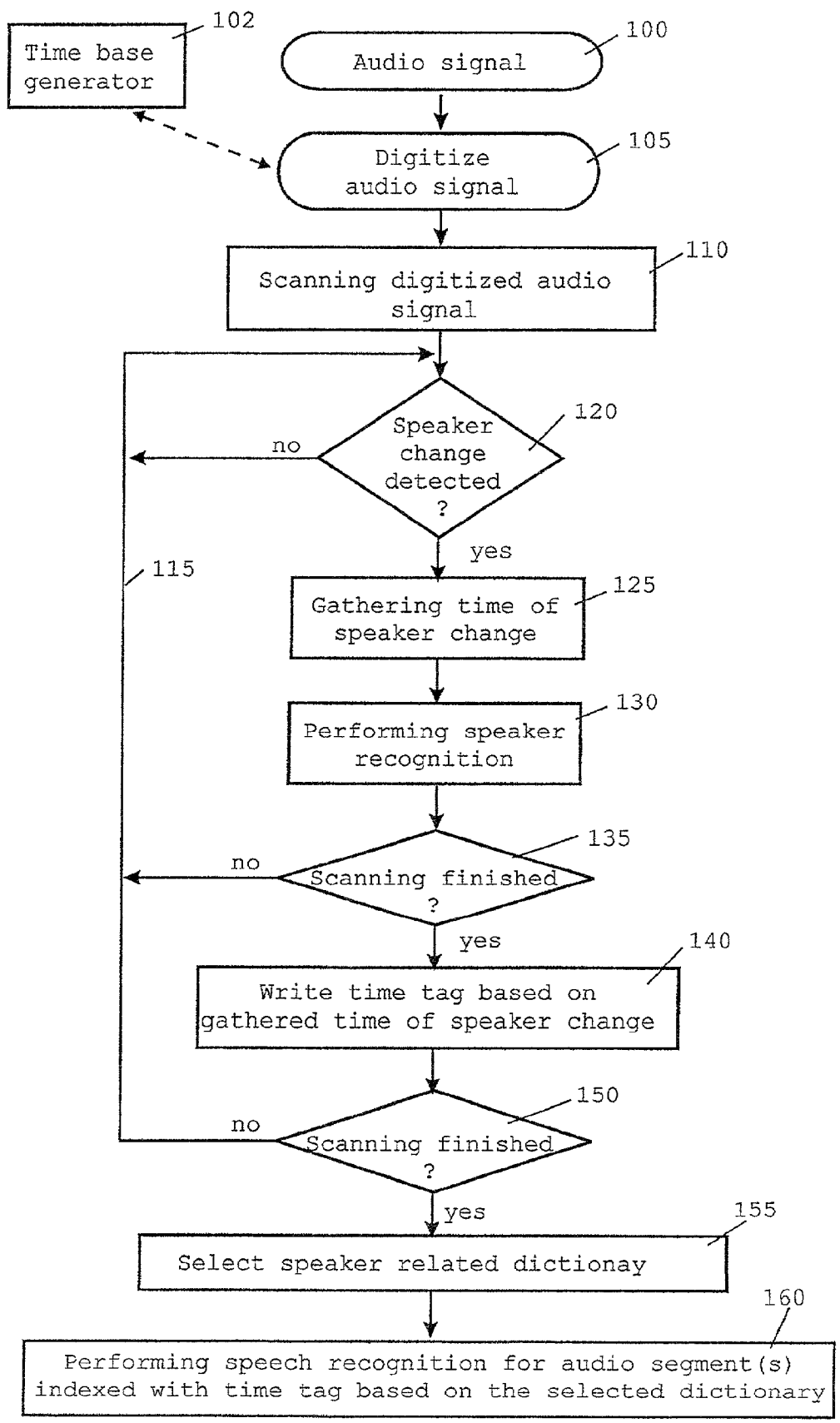
FIG. 1b is another flow diagram which illustrates a more detailed embodiment of the invention.

Now referring to the flow diagram depicted in FIG. 1b, a continuous audio signal 100, either recorded by means of an analog storage media or provided real-time, is first digitized 105. The digitized audio data are then scanned 110 whereby it is checked during loop 115 whether a speaker change occurs 120 and whether the detected new speaker is identical with a predefined or known speaker. The latter step is performed by means of speaker recognition 130 using prior art technology.

It is emphasized that the steps of detecting a speaker change 120 and performing a speaker recognition 130 can be alternatively performed in the reverse direction wherein the results of the speaker recognition 130 themselves can be used in order to detect speaker changes 120 thus simplifying the above described approach.

If the speaker change detection 120 reveals that a speaker change has occurred, the current time is taken 125 and protocolled e.g. in a log file. Having performed the speaker recognition 130 it is checked 135 whether the recognized speaker is identical with a predefined speaker. If true, the audio segments starting with the detected speaker changes are indexed 140 by using the protocolled time 125.

The scanning of the audio stream is continued 150 until the entire audio stream is scanned through and analyzed in the above described manner. Having finished the scan, only for the segments corresponding to selected speakers a speech recognition procedure, as known in the prior art, is performed 160. Hereby, in a preceding step 155, a speaker-related voice tract model and/or dictionary for the recognized speaker (step 130) is selected wherein the speech recognition 160 is performed based on that dictionary.

It is further noted that the steps 110 and 150 are optional and related to a scenario where an audio stream stored on a data carrier is scanned offline in order to perform the method according to the invention. Without these steps the mechanism can be performed for a real-time audio stream like a speech signal incoming in a speech or voice recognition system.

Using a time base generator (step 102) as an external time reference for enabling writing of the time tags (step 140) is also optional and needed only in cases where the original audio signal does not comprise timing information.

The described method advantageously enables to perform speech recognition only for audio segments in a continuous audio stream which have been uttered by a given speaker.

Figure 2:
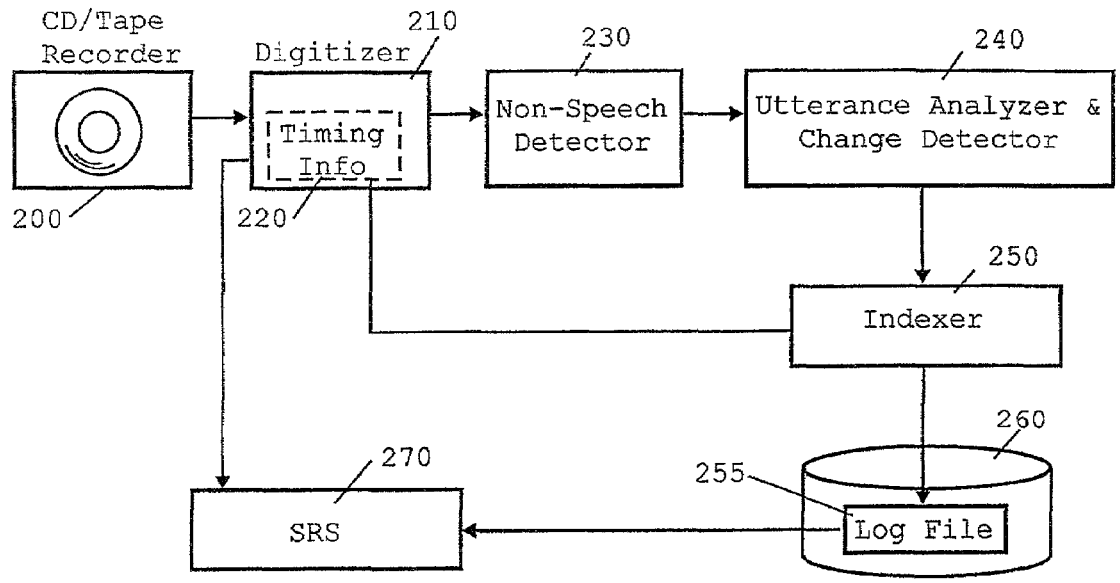
FIG. 2 is a block diagram depicting the basic components of a first embodiment of the apparatus according to the invention.

FIG. 2 depicts a first embodiment of an apparatus according to the invention. In this embodiment, the continuous audio stream is recorded on a tape storage 200. First the audio stream is digitized by means of a prior art digitizer 210 particularly revealing digitized timer information 220 for the audio stream. In addition, the digitized audio stream is searched for speech/non-speech boundaries by means of an appropriate detector 230 also well-known in the prior art. The non-speech detector 230 delivers first candidates of speaker-change boundaries in form of first audio segments.

For these audio segments an utterance analysis is performed by means of an utterance analyzer & change detector 240. The audio stream is analyzed by an utterance analyzer which scans through the audio stream in order to gather speaker-specific audio features. For instance, the utterance analyzer can be implemented as a spectrum analyzer which takes information in the neighborhood of frequency bands which are characteristic for different speakers. The analyzed utterance signal is forwarded to an utterance changed detector which detects speaker changes. If an utterance or speaker change is detected by detector 240, the time of the speaker change is taken from the timer information provided by the digitizer 210, or an external timer, and written to a log file 255 stored in a database 260 by means of an indexer 250. It should be noted, that in many SRS systems, the utterance analyzer is already an integrated part of the SRS (e.g. P. S. Gopalakrishnan et al, Acoustic models used in the IBM System for the ARPA HUB4 task, Proc. of the Speech Recognition Workshop, ARPA, 1996).

For most applications, the time information alternatively can be taken from the clock of a computer system or a dedicated hardware that is used to perform the speaker recognition. In cases where a higher precision is needed for the timing information, e.g. in an automatic logging or indexing of air control dialogues, the time can be taken from an external time reference that is merged with the audio stream during the digitization step.

Taking the logged index information together with the digitized audio stream provided by the digitizer 210, a speech recognition system (SRS) 270 as known in the prior art can perform a speech recognition procedure on the audio stream, but solely for the indexed audio segments.

It should be noted that the system described herein before processes audio data digitized by prior art technology. In e.g. a call center environment, such data are usually collected from the telephone set or the head set of an operator. For logging and archiving the digitized data stream is stored in a file, either on a call-by-call or shift-by-shift basis. The same digitized audio stream is then passed through the described speaker recognition system that computes features allowing the identification of individual speakers.

Figure 3:
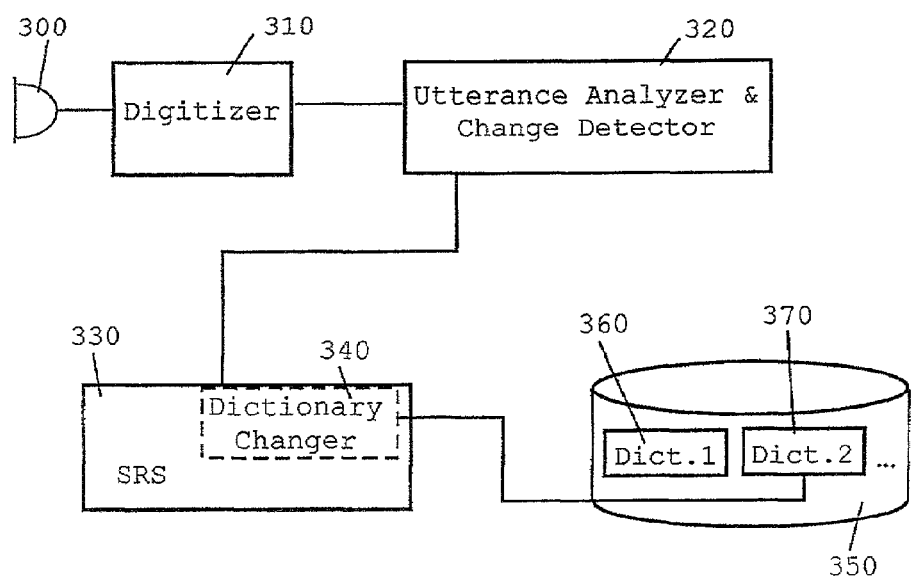
FIG. 3 is another block diagram depicting a second embodiment of the apparatus according to the invention.

Now referring to FIG. 3, a second embodiment of the apparatus according to the invention is described. A real-time audio stream is input to a microphone 300 and digitized by means of a digitizer 310. The digitized audio stream is input to an utterance analyzer & change detector 320 in order to detect speaker changes as described above. A speech recognition system (SRS) 330 has implemented a speaker model and/or dictionary change utility 340 which has access to different speaker-trained data 360, 370 stored in a database 350. Dependent on allegedly detected speaker changes, the dictionary change utility 340 can interchange between the different models 350, 370 thus providing an optimized multiuser SRS.

An example of a log file encoded using XML markup language in accordance with the invention is depicted in FIG. 4. The shown call center scenario starts with an incoming customer call 400 and a welcome text 410 spoken by an operator of the call center. The operator is assumed to be a preselected speaker with a known speaker ID which is ~s0127" in the present example. Thus the start time and the end time of the welcome text 410 are marked with corresponding tags 420, respectively. The customer not being a preselected speaker with an ID is responding to the welcome text 410 and the audio signal tagged with the corresponding start time and end time accordingly but storing that the speaker ID is ~unknown~. Next the operator asks the customer for the customer number 440 wherein the audio signal is tagged again 450 with the known speaker ID. These steps are continued accordingly until the end of the call wherein in step 460 the operator repeats the customer number named by the customer in the preceding step and confirms the correct database entry of the customer ~ and the address is Helga Mustermann the . . . ~. At the end of the call the audio signal is tagged with the endcall time 470.

It should further be noted that the above described method and apparatus can either be implemented in hardware, software or a combination thereof.

The invention claimed is:

1. A method of processing a continuous audio stream containing human speech from a plurality of speakers related to at least one particular transaction, comprising the steps of:

digitizing the continuous audio stream;
detecting a speaker change in the digitized audio stream;
performing a speaker recognition if a speaker change is detected;
determining whether a recognized speaker is a predetermined speaker; and
transcribing at least part of the continuous audio stream only if the recognized speaker is the predetermined speaker;
wherein said transcribing is processed using a dictionary of speaker-trained data trained by the speaker being transcribed.

2. A method according to claim 1, comprising a further step of protocolling time information for detected speaker changes.

3. A method according to claim 1, wherein the step of detecting a speaker change and/or the step of performing a speaker recognition is/are preceded by a further step of detecting non-speech boundaries between continuous speech segments.

4. A method according to claim 1, wherein the step of detecting a speaker change is accomplished by use of at least one characteristic audio feature, in particular features derived from the spectrum of the audio signal.

5. A method according to claim 1, wherein the step of performing a speaker recognition involves the particular steps of calculating a speaker signature from the audio stream and comparing the calculated speaker signature with at least one known speaker signature.

6. A method according to claim 1 for use in a speech recognition or voice control system comprising at least two speaker-specific speaker models and/or dictionaries, wherein interchanging between the at least two speaker-specific dictionaries is dependent on the detected speaker change and the corresponding recognized speaker.

7. A method of processing a continuous audio stream containing human speech of a plurality of speakers related to at least one particular transaction, comprising the steps of:

digitizing the continuous audio stream;
detecting a speaker change in the digitized audio stream;
performing a speaker recognition if a speaker change is detected;
determining whether a recognized speaker is a predetermined speaker;
indexing the audio stream with respect to the detected speaker change only if the recognized speaker is the predetermined speaker;
wherein said indexing is processed using a dictionary of speaker-trained data trained by the speaker being transcribed.

8. A method according to claim 7, comprising a further step of protocolling time information for detected speaker changes.

9. A method according to claim 7, wherein the step of detecting a speaker change and/or the step of performing a speaker recognition is/are preceded by a further step of detecting non-speech boundaries between continuous speech segments.

10. A method according to claim 7, wherein the step of detecting a speaker change is accomplished by use of at least one characteristic audio feature, in particular features derived from the spectrum of the audio signal.

11. A method according to claim 7, wherein the step of performing a speaker recognition involves the particular steps of calculating a speaker signature from the audio stream and comparing the calculated speaker signature with at least one known speaker signature.

12. A method according to claim 7 for use in a speech recognition or voice control system comprising at least two speaker-specific speaker models and/or dictionaries, wherein interchanging between the at least two speaker-specific dictionaries is dependent on the detected speaker change and the corresponding recognized speaker.

13. An apparatus for processing a continuous audio stream containing human speech from a plurality of speakers related to at least one particular transaction, comprising:
   a digitizer which digitizes the continuous audio stream;
   a detector which detects speaker changes in the digitized audio stream;
   a recognizer which recognizes the predetermined speaker in the audio stream;
   a determiner which determines whether a recognized speaker is a predetermined speaker; and
   an initiator which initiates transcription of at least part of the continuous audio stream only if the recognized speaker is the predetermined known speaker;
   wherein said transcription is processed using a dictionary of speaker-trained data trained by the speaker being transcribed.

14. An apparatus according to claim 13, further comprising a detector which detects non-speech boundaries between continuous speech segments.

15. An apparatus according to claim 13, further comprising a scanner which automatically scans a continuous audio record, in particular a continuous audio stream recorded on a data or a signal carrier, and for detecting speaker changes in the continuous audio record.

16. An apparatus according to claim 13, further comprising a monitor which continuously monitors a real-time continuous audio stream and performing the steps of
   digitizing the continuous audio stream;
   detecting a speaker change in the digitized audio stream;
   performing a speaker recognition if a speaker change is detected; and
   transcribing at least part of the continuous audio stream if a predetermined speaker is recognized.

17. An apparatus according to claim 13, further comprising a monitor which continuously monitors a real-time continuous audio stream and performing the steps of
   digitizing the continuous audio stream;
   detecting a speaker change in the digitized audio stream;
   performing a speaker recognition if a speaker change is detected; and
   indexing the audio stream with respect to the detected speaker change if a predetermined speaker is recognized.

18. An apparatus according to claim 13, further comprising a logging device which protocols time information for the at least one detected speaker change.

19. An apparatus according to claim 13, comprising a marking device which marks at least the beginning of a detected speech segment related to a predetermined speaker.

20. An apparatus according to claim 13, comprising data base which stores speech signatures for at least two speakers.

21. An apparatus for processing a continuous audio stream containing human speech from a plurality of speakers related to at least one particular transaction, comprising:
   a detector which detects speaker changes in the audio stream;
   a digitizer which digitizes the continuous audio stream;
   a recognizer which recognizes the predetermined speaker in the digitized audio stream;
   a determiner which determines whether a recognized speaker is a predetermined speaker; and
   an indexer for indexing at least part of the continuous audio stream only if the recognized speaker is the predetermined known speaker;
   wherein said indexing is processed using a dictionary of speaker-trained data trained by the speaker being transcribed.

22. An apparatus according to claim 21, further comprising a detector which detects non-speech boundaries between continuous speech segments.

23. An apparatus according to claim 21, further comprising a scanner which automatically scans a continuous audio record, in particular a continuous audio stream recorded on a data or a signal carrier, and for detecting speaker changes in the continuous audio record.

24. An apparatus according to claim 21, further comprising a monitor which continuously monitors a real-time continuous audio stream and performing the steps of
   digitizing the continuous audio stream;
   detecting a speaker change in the digitized audio stream;
   performing a speaker recognition if a speaker change is detected; and
   transcribing at least part of the continuous audio stream if a predetermined speaker is recognized.

25. An apparatus according to claim 21, further comprising a monitor which continuously monitors a real-time continuous audio stream and performing the steps of
   digitizing the continuous audio stream;
   detecting a speaker change in the digitized audio stream;
   performing a speaker recognition if a speaker change is detected; and
   indexing the audio stream with respect to the detected speaker change if a predetermined speaker is recognized.

26. An apparatus according to claim 21, further comprising a logging device which protocols time information for the at least one detected speaker change.

27. An apparatus according to claim 21, comprising a marking device which marks at least the beginning of a detected speech segment related to a predetermined speaker.

28. An apparatus according to claim 21, comprising data base which stores speech signatures for at least two speakers.

29. A program storage device readable by machine, tangibly embodying a program of instructions executable by the machine to perform method steps for processing a continuous audio stream containing human speech from a plurality of speakers related to at least one particular transaction, said method comprising the steps of:
   digitizing the continuous audio stream;
   detecting a speaker change in the digitized audio stream;
   performing a speaker recognition if a speaker change is detected;
   determining whether a recognized speaker is a predetermined speaker; and
   transcribing at least part of the continuous audio stream only if the recognized speaker is the predetermined speaker;
   wherein said transcribing is processed using a dictionary of speaker-trained data trained by the speaker being transcribed.

30. A program storage device readable by machine, tangibly embodying a program of instructions executable by the machine to perform method steps for processing a continuous audio stream containing human speech from a plurality of speakers related to at least one particular transaction, said method comprising the steps of:
- digitizing the continuous audio stream;
- detecting a speaker change in the digitized audio stream;
- performing a speaker recognition if a speaker change is detected;
- determining whether a recognized speaker is a predetermined speaker;
- indexing the audio stream with respect to the detected speaker change only if the recognized speaker is the predetermined speaker;
- wherein said indexing is processed using a dictionary of speaker-trained data trained by the speaker being transcribed.

* * * * *